United States Patent Office 2,973,241
Patented Feb. 28, 1961

2,973,241

METHOD FOR PRODUCING HIGH CRYSTALLINE 1-OLEFIN POLYMERS OF DECREASED FLAMMABILITY BY TREATMENT WITH NITRIC ACID AND RESULTING PRODUCTS

John N. Scott, Jr., and Rufus V. Jones, Bartlesville, Okla., assignors to Phillips Petroleum Company, a corporation of Delaware No Drawing. Filed Oct. 26, 1956, Ser. No. 618,426

8 Claims. (Cl. 8—115.5)

This invention relates to a novel process for treating 1-olefin polymers containing a high degree of crystallinity in order to decrease the flammability and to increase the dyeability of such polymers.

It has recently been discovered that 1-olefins can be homopolymerized or copolymerized with small amounts of other 1-olefins at low temperature and pressures as compared with conventional polymerization processes to produce polymers of high crystallinity, high tensile strength, and high softening points. Such polymerization is generally carried out by first admixing and at least partially dissolving the olefins in a non-polymerizable solvent and carrying out the polymerization in the presence of a catalyst. While such catalytically produced polymers exhibit properties which are different in many ways from the polymers which are produced by a high-pressure, non-catalytic polymerization process, many of the properties which are inherent in such polymers are retained in these catalytically produced polymers, as for example, flammability and these polymers are also difficult to dye.

An object of this invention therefore is to provide a method of reducing flammability of a highly crystalline 1-olefin polymer. Another object of this invention is to provide a readily dyeable 1-olefin polymer. Other objects, advantages and features of this invention will be obvious to those skilled in the art having been given this disclosure.

According to this invention, a highly crystalline 1-olefin polymer having a softening point of at least 215° F. is treated with nitric acid at a temperature of at least 210° F. to produce polymers of decreased flammability and increased dyeability.

The polymers to which this invention is applicable are those polymers which have recently come into prominence and which have a high degree of crystallinity, say of at least 70 percent at room temperature when determined by nuclear magnetic resonance method and most generally will have a crystallinity of at least 80 percent. These polymers are preferably homopolymers of ethylene, however, ethylene can be polymerized with up to 10 weight percent of other 1-olefins, say up to 8 carbon atoms and having no branching nearer the double bond than the 4-position and still retain the crystalline nature, it being understood that the higher molecular weight comonomers cannot be used in as large a percentage as can the lower molecular weight materials and that crystallinity decreases with increased amounts of these comonomers. For these reasons, where comonomers are used they will most generally be propylene and butylene. Examples of copolymerizable monomers include propylene, 1-butene, 1-pentene, 1-hexene, 1-octene, 4-methyl-1-pentene, 4-methyl-1-hexene, 6-methyl-1-heptene, 4-ethyl-1-hexene and the like, as well as those 1-olefins having additional unsaturation such as butadiene. Also homopolymers and copolymers of these other 1-olefins when polymerized to produce high crystalline polymers can be treated by the method of this invention, e.g., polypropylene.

This invention is not limited to any particular method of preparing the polymer so long as the polymer is of the highly crystalline type. One method for preparing such polymers is fully described in the copending application of Hogan et al., filed December 20, 1954, and having Serial No. 476,306, now abandoned. In this application a process is disclosed for producing novel polymer of 1-olefins by carrying out the polymerization at a temperature in the range of 100 to 500° F. in the presence of 0.1 at least 10 or more weight percent of chromium as chromium oxide, including a substantial proportion of hexavalent chromium associated with at least one porous oxide selected from the group consisting of silica, alumina, zirconia, and thoria. A preferred catalyst is one comprising 0.1 to 10 weight percent chromium as the oxide on a silica-alumina support such as 90 percent silica–10 percent alumina. This catalyst is a highly oxidized catalyst which has been activated by high-temperature treatment, e.g., 450–1500° F., in a non-reducing atmosphere and preferably with an oxidizing gas, e.g., anhydrous air. The polymerization is preferably carried out in the liquid phase such as in solution in a hydrocarbon solvent, especially a paraffin or naphthene which is liquid under the polymerization conditions; however, vapor phase operation or mixed phase operation can be effected. This invention is particularly applicable to polymers prepared by the above method, however, polymers prepared by other catalyst systems can be treated by the method of this invention, e.g., polymers prepared by the organometallic catalyst as disclosed by Karl Ziegler in Belgium Patent 533,362, November 16, 1954.

This invention is particularly adapted to treating polymers which have been prepared as fiber or film, however, other forms of the polymer can be treated at least on the surface. Also, such polymer as prepared is frequently in the form of small pellets and these pellets can be treated prior to forming the finished product. This method of treatment is especially useful wherein the final product is to be of relatively large size.

The amount of nitric acid employed in the process of this invention should be an excess, that is, sufficient nitric acid should be used that all of the surface area of the ethylene polymer being treated will remain in contact with nitric acid throughout the treating period. The nitric acid is preferably of an aqueous concentration within the range of 25 and 100 weight percent $HNO_3$.

The process of this invention can be carried out at any temperature within the range of 210° F. to about 15° F. below the softening temperature of the polymer. In the case of polyethylene, the upper temperature is generally not greater than 260° F. With copolymers of ethylene and other 1-olefins, the treating temperature, in some instances, will be restricted to the low end of the range while with other copolymers the temperature can go as high as 350° F. or even higher depending upon the softening temperature of the particular polymer. The time of treatment can vary over a wide range and using strong acid at high temperatures satisfactory results can be obtained in relatively short periods of time, say 0.1 minute while under other conditions the time of treatment can range say up to 2 hours. In general, longer time produces no harmful effects. After the polymers have been contacted with the nitric acid, the treated polymers are washed with water to remove residual nitric acid, after which the residual water can be removed by any suitable process, e.g., drying or washing with acetone.

The polymers which have been treated with nitric acid by the method of this invention are much less flammable than are untreated polymers and when treated for 30 minutes or more, the resulting products are essentially non-flammable.

The process of the present invention also serves to improve dyeability or dye-receptivity of these polymers especially when prepared in fibers, films and thin slabs. While the polymers produced by the described process are more receptive to all dyes, they are particularly improved in receptivity of the azo and diazo type dyes.

These advantages of decreased flammability and increased dyeability are obtained without substantially affecting the other desirable properties of such polymers such as tensile strength.

To illustrate the effectiveness and advantages of our invention, the following examples are given. Since the homopolymer of ethylene is of particular commercial importance, we will illustrate our invention with this material.

An ethylene stream comprising approximately 95 percent ethylene and the remaining material being primarily ethane with lesser amounts of methane and propane along with trace amounts of other hydrocarbons polymerized in a chromium oxide-silica-alumina catalyst according to the aforementioned method of Hogan et al. The ethylene stream is first admixed with cyclohexane as the solvent and continuously passed to a reactor having a temperature of about 285° F. and a pressure of about 420 p.s.i.a. Catalyst consisting of chromium oxide of about 2.5 percent chromium on a 90 percent silica–10 percent alumina support is also fed to the reactor to maintain a catalyst concentration of approximately 0.1 weight percent. This catalyst has been activated with air by calcining at about 950° F. The ethylene residence time is about 2 hours and the reactor effluent contains approximately 8 percent polymer. The effluent is first filtered to remove catalyst after which the polymer is recovered by coagulation, separated, dried and extruded. The polymer so produced has a density of 0.96 expressed in grams per cubic centimeter and crystallinity of over 90 percent, a softening temperature of about 260° F. and a melt index of 0.6.

EXAMPLE I

A relatively large sample of high molecular weight polyethylene prepared by the method of Hogan et al. was extracted with a mixture comprising 3 parts n-heptane and 97 parts methylcyclohexane. Thirty-six percent of this polymer was found to be insoluble in this mixture. This extraction was carried out in a stainless steel cage, and it was noted that said cage was extremely difficult to clean with concentrated $HNO_3$. It was apparent the $HNO_3$, at best, was only attacking the polymer very slowly, so the cage and the adhering insoluble polymers were placed in boiling concentrated nitric acid for one hour, after which the polymer was removed and washed with tap water. The washed polymer was unchanged in appearance, but when a sample was ignited with a match, it did not continue to burn. A pressed film of this material was very clear and completely non-flammable. A small piece of this pressed film was then examined by infrared analysis. The infrared data showed that the spectrum of the nitric acid treated polyethylene was found to be consistent with the following structure:

(1) Long chain paraffin —$CH_2$— sequences
(2) Paraffinic nitro groups —C—$NO_2$
(3) Organic nitrates –O–$NO_2$
(4) Carbonyl groups=O
(5) Ionic nitrate $NO_3$—
(6) Absence of terminal vinyl groups The absence of terminal vinyl groups in the nitric acid treated polyethylene, present in the control indicates that some nitration may have occurred at the double bond. The fact that groups other than carbonyl were indicated would mean that but few carbonyl groups could be present since otherwise the spectra of other groups would have been obscured.

EXAMPLE II

Sixty grams of polyethylene, in speroid form of about 1/16 inch diameter which had been prepared by polymerizing ethylene at 500 p.s.i.g. and 300° F. in the presence of a chromium oxide-silica-alumina catalyst, was placed in a beaker and covered with reagent grade nitric acid (69.5% $HNO_3$ by weight) which had been preheated to 248° F. The polymer was kept immersed by means of a stainless steel screen cover. The beaker was placed on a hot plate whereon the beaker contents were maintained at the 248° F. After 30 minutes at this temperature, the polymer was removed from the beaker and washed with tap water for approximately 15 minutes to remove the nitric acid. The polymer was then washed with acetone to remove the water, after which the polymer was dried. A film was pressed from the treated polymer and this film was found to be very clear and essentially non-flammable. A sample of the untreated polymer was also pressed into a film, and this material was also clear but readily flammable.

EXAMPLE III

A series of runs were made in which extruded and oriented fibers of the polyethylene of Example I were treated with nitric acid. In these runs, individual samples were treated for 15 minutes, 30 minutes, and 1 hour at 212° F. (100° C.) with 69.5 percent by weight nitric acid. The resulting treated fibers were very resistant to burning, and the fibers which had been treated for 30 minutes were substantially non-flammable.

The fibers which had been treated by the above-described procedure were dyed with Rit All Purpose dye by the prescribed method for dyeing acetate rayon. A sample of untreated polyethylene fiber was also subjected to this dyeing treatment. In this dyeing step, one package of dye was dissolved in one-half pint of water, after which the solution was strained and divided into four equal portions in separate beakers containing the material to be dyed. These solutions (containing the fibers) were kept at 176–194° F. for 45 minutes. After 30 minutes of this dyeing time had elapsed, approximately .5 milliliter of saturated sodium chloride solution was added to each beaker. At the end of the 45-minute period, the fibers were removed from the beakers and washed free of soluble dye with tap water. The control run was dyed only slightly, while the nitric acid treated fibers were red in color. There was a vivid evidence of gradation of color, with the fibers which had been treated the longest time with nitric acid being much more deeply colored.

EXAMPLE IV

A blend of ethylene polymers, prepared by blending polymers from a series of runs in which ethylene was polymerized in the presence of a chromium oxide-silica-alumina catalyzed polymerization, was pressed to sheets of 0.002–0.0003 inch thickness between chrome plates. The polymer blend which was formed into sheets had the following physical properties.

| | |
|---|---|
| Weight percent volatiles | .09 |
| Melting point, ° F. | 252±2 |
| Melt index | 0.769 |
| Injection molded tensile strength _____p.s.i__ | 4566 |
| Compression molded tensile strength____p.s.i__ | 4531 |
| Stiffness _____p.s.i__ | 136,600 |
| Ash _____wt. percent__ | 0.026 |
| Density | 0.963 |
| Molecular weight | 41,200 |
| Injection molded elongation (percent) | 32 |
| Compression molded elongation (percent) | 18 |
| Heat distortion, ° F. (1/4" x 1/2") | 180 |

The sheets of polyethylene were then immersed in 69.5 weight percent nitric acid at 220–230° F. for 30 minutes. The sheets were then removed, washed with water, and dried under vacuum at 65° C. for two hours. The results of these runs are expressed below in Table I.

Table I

| Run No. | Type of Polymer | Tensile Strength | Percent Elongation | Nitrogen Content (by Dumas), Wt. Percent |
|---|---|---|---|---|
| 1 | HNO₃ treated polymer from catalytic polymerization | 3,549 | 65 | 0.07 |
| 2 | HNO₃ ¹ treated commercial | | | 0.83 |
| 3 | Control ² | 3,774 | 240 | |
| 4 | Control ³ | 2,524 | 602 | |

¹ In this run, commercial polyethylene prepared by the conventional high pressure process (DYNH) was treated by the same procedure described above. The polymer thus produced was a yellow, shapeless mass.
² These properties (run 3) are for a polyethylene prepared by a chromium oxide-silica-alumina catalyzed polymerization (identical to the polymer which was treated) and which was not treated with nitric acid.
³ These properties are for a sample of the commercial polyethylene which was not treated with nitric acid.

In the above runs, the tensile strengths were determined by the ASTM method, Designation D412–51T (Die C), for determining tensile strength of plastics. The crosshead speed used in these tests was 12 inches per minute.

EXAMPLE V

Fibers were prepared from polyethylene which had been produced by polymerizing ethylene in the presence of a chromium oxide-silica-alumina catalyst. These fibers were treated with 69.5 weight percent nitric acid for periods of 15 minutes, 30 minutes, and 1 hour. A portion of the fibers produced were then dyed by the method described in Example III, after which the fibers were tested for tensile strength, elongation, and density. Both the dyed and undyed fibers were tested for these properties, and these properties were also determined for a control sample of the same polyethylene (fibers) which had not been treated with nitric acid. The results of these tests are expressed below in Table II.

Table II

| Properties | Control | | 15-Minute Treatment | | 30-Minute Treatment | | 1-Hour Treatment | |
|---|---|---|---|---|---|---|---|---|
| | Dyed | Undyed | Dyed | Undyed | Dyed | Undyed | Dyed | Undyed |
| Tensile Strength | 39,000 | 42,267 | 39,151 | 38,954 | 41,509 | 41,037 | 32,311 | 34,947 |
| Percent Elongation | 18 | 24 | 31 | 28 | 45 | 75 | 20 | 21 |
| Density | .959 | .952 | .956 | .956 | .958 | .958 | .946 | .957 |

We claim:
1. A method of decreasing the flammability of a solid polymer selected from the group consisting of homopolymers of ethylene, propylene, 1-butene, 1-pentene, 1-hexene, 1-octene, 4-methyl-1-pentene, 4-methyl-1-hexene, 6-methyl-1-heptene, and 4-ethyl-1-hexene and a copolymer of one of said monomers with a small amount of a different monomer selected from said monomers and butadiene, said polymer having a crystallinity of at least 80 percent at room temperature as determined by nuclear magnetic resonance which comprises contacting said polymer in its solid phase with nitric acid of 25 to 100 percent concentration at a temperature in the range of 210° F. to about 15° F. below the softening point of said polymer for a time of about 30 minutes to 2 hours.

2. The method of claim 1 wherein said polymer is in the form of a fiber during said contacting step.

3. The method of claim 1 wherein said polymer is in the form of a film during said contacting step.

4. A method of decreasing the flammability of solid polyethylene having a crystallinity of at least 80 percent at room temperature as determined by nuclear magnetic resonance which comprises contacting said polyethylene in its solid phase with nitric acid of 25 to 100 percent concentration at 210 to 260° F. for about 30 minutes to 2 hours.

5. An improved thermoplastic having low flammability comprising a normally flammable solid polymer selected from the group consisting of homopolymers of ethylene, propylene, 1-butene, 1-pentene, 1-hexene, 1-octene, 4-methyl-1-pentene, 4-methyl-1-hexene, 6-methyl-1-heptene, and 4-ethyl-1-hexene and a copolymer of one of said monomers with a small amount of a different monomer selected from said monomers and butadiene, said polymer having a crystallinity of at least 80 percent at room temperature as determined by nuclear magnetic resonance which has been contacted in its solid phase with nitric acid of 25 to 100 percent concentration at a temperature in the range of 210° F. to about 15° F. below the softening point of said polymer for a time of about 30 minutes to 2 hours.

6. The thermoplastic of claim 5 in the form of fiber.
7. The thermoplastic of claim 5 in the form of film.
8. An improved polyethylene having a crystallinity of at least 80 percent at room temperature as determined by nuclear magnetic resonance, said polyethylene having been rendered substantially non-flammable by contact in its normally flammable solid phase with nitric acid of 25 to 100 percent concentration at 210 to 260° F. for about 30 minutes to 2 hours.

References Cited in the file of this patent

UNITED STATES PATENTS

| Re. 24,062 | Horton | Sept. 20, 1955 |
| 2,461,966 | Davis | Feb. 15, 1949 |
| 2,801,446 | Wolinski | Aug. 6, 1957 |
| 2,801,447 | Wolinski | Aug. 6, 1957 |

FOREIGN PATENTS

| 525,775 | Belgium | July 16, 1954 |
| 581,279 | Great Britain | Oct. 7, 1946 |
| 476,476 | Canada | Aug. 28, 1951 |

OTHER REFERENCES

Bryant: Jour. of Polymer Science, vol. 2, 1947, p. 553.
Hopkins: Jour. of Applied Physics, March 1950, pp. 206–213.